US011332327B2

(12) United States Patent
Howe et al.

(10) Patent No.: US 11,332,327 B2
(45) Date of Patent: May 17, 2022

(54) TRANSPORTER SYSTEM WITH CARGO CONTAINER AND AUTOMATICALLY ACTUATED UNLOADING SYSTEM

(71) Applicants: Marcio Howe, Victor Graeff (BR); Mauricio Howe, Victor Graeff (BR); Armin Howe, Victor Graeff (BR)

(72) Inventors: Marcio Howe, Victor Graeff (BR); Mauricio Howe, Victor Graeff (BR); Armin Howe, Victor Graeff (BR)

( * ) Notice: Subject to any disclaimer, the term of this patent is extended or adjusted under 35 U.S.C. 154(b) by 0 days.

(21) Appl. No.: 17/059,440

(22) PCT Filed: May 26, 2019

(86) PCT No.: PCT/BR2019/050194
§ 371 (c)(1),
(2) Date: Nov. 29, 2020

(87) PCT Pub. No.: WO2019/227189
PCT Pub. Date: Dec. 5, 2019

(65) Prior Publication Data
US 2021/0214175 A1   Jul. 15, 2021

(30) Foreign Application Priority Data

May 29, 2018   (BR) .......................... 1020180109545

(51) Int. Cl.
*B65G 67/24*   (2006.01)
(52) U.S. Cl.
CPC .................................. *B65G 67/24* (2013.01)
(58) Field of Classification Search
CPC ...... B65G 65/22; B65G 63/047; B65G 67/24; B65G 33/32; B65G 65/46; B65G 33/08

USPC .................................................. 414/526, 507
See application file for complete search history.

(56) References Cited

U.S. PATENT DOCUMENTS

| 4,144,655 | A | 3/1979 | Harris |
| 4,669,945 | A | 6/1987 | Pollard et al. |
| 6,767,174 | B2 | 7/2004 | Cresswell |
| 8,851,822 | B2 * | 10/2014 | Travis ..................... A01C 7/208 |
| | | | 414/526 |
| 2009/0290970 | A1 | 11/2009 | Farley et al. |
| 2014/0090958 | A1 | 4/2014 | Mulder et al. |
| 2014/0365170 | A1 * | 12/2014 | Van Mill ................. A01D 90/12 |
| | | | 702/173 |
| 2018/0242521 | A1 * | 8/2018 | Thomson ........... A01D 41/1217 |

FOREIGN PATENT DOCUMENTS

BR      MU 9100430-6 U2     5/2013

* cited by examiner

*Primary Examiner* — Saul Rodriguez
*Assistant Examiner* — Willie Berry, Jr.
(74) *Attorney, Agent, or Firm* — Scott Houtteman; Houtteman Law, LLC

(57) ABSTRACT

A cargo unloading system is described. It provides more efficient intermodal transportation by transferring cargo such as granulates, brans, powders or solids placed inside a shipping container through tubes with internal threads to the next transport mode automatically and in a very short period of time. The system is made up of the cargo container, a mechanical unloading system with motors actuated to move screws and an independent hydraulic/electric unit. The system can be mounted on a road-vehicle, ship, aircraft or stationary base, and it may also be self-propelled.

5 Claims, 9 Drawing Sheets

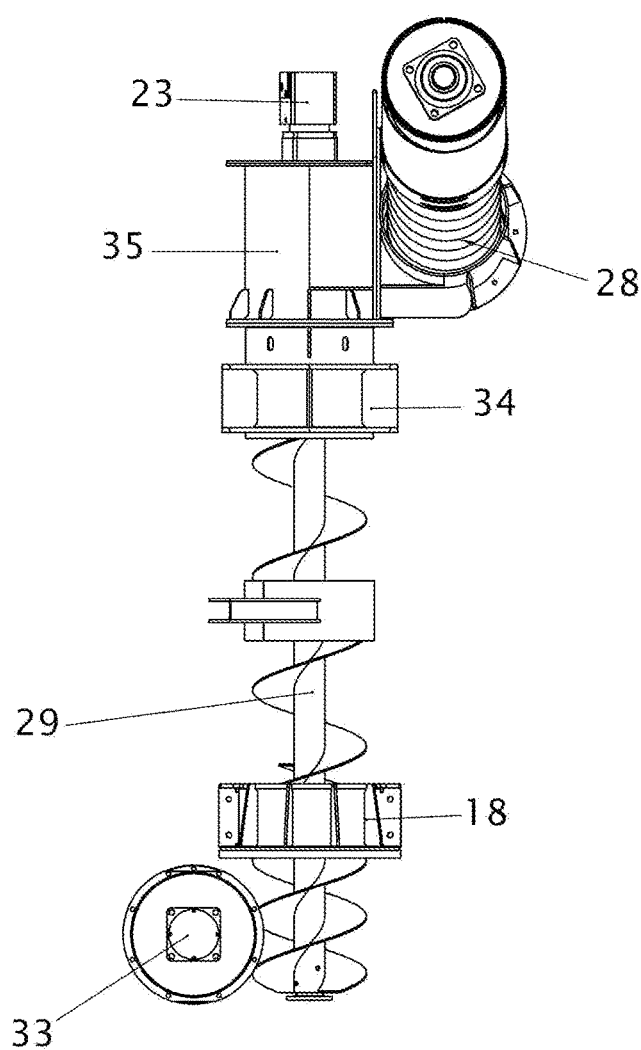
FIG. 05
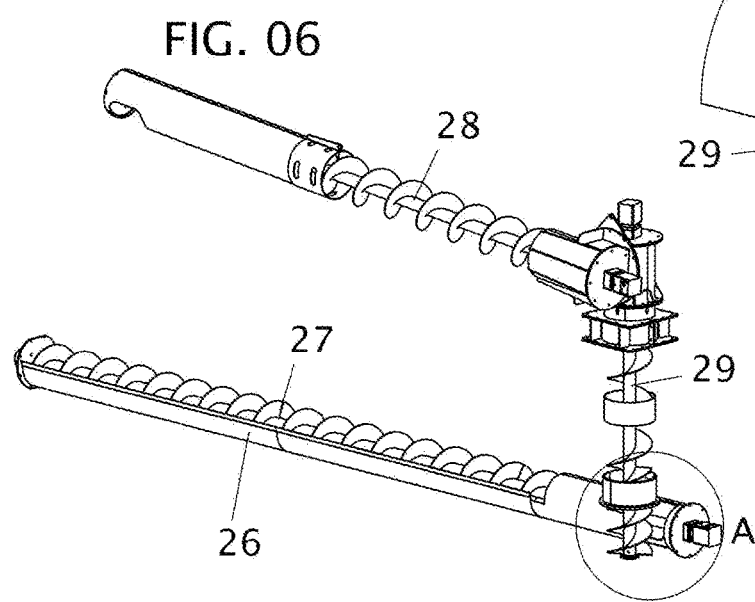
FIG. 06
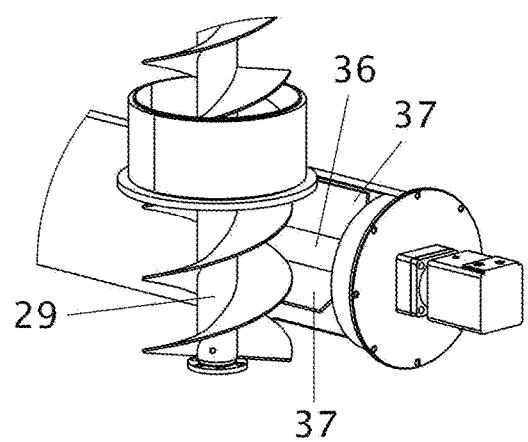
DETAIL A

1

TRANSPORTER SYSTEM WITH CARGO CONTAINER AND AUTOMATICALLY ACTUATED UNLOADING SYSTEM

The following disclosure refers to the development of a conveyor system with a cargo box and unloading system with automatic activation, consisting of a cargo box, also called a reservoir, a mechanical unloading system, and an independent hydraulic/electric unit, and said transporter can be mounted on a road base, on ships, on planes or in a stationary base, and can also be self-propelled, allowing for the automatic unloading of materials deposited inside the cargo box by means of the remote control unloading system.

DESCRIPTION OF THE STATE OF THE ART

The transportation of granular materials, such as soybeans, corn, coffee, etc., or other products of an agricultural nature or not, can be carried out by means of trucks/wagons/special containers equipped with an unloading system by means of threads placed inside discharge tubes, and these unloading tubes can be moved to facilitate the maneuvers to transfer transported material.

The so-called bulk silos are equipment that allows the unloading of products through threads arranged on the inside. An example of such equipment can be seen in document Brazilian MU 9100430-6, which shows a conveyor, such as a belt, ribbon or chain, sliding on a table, the main axis of which can be driven by a reducer, an electric motor, hydraulic motor or shaft card, extracting the product from inside the deposit silo; a drawer or registration system, which can also dose the quantity of product on said conveyor, is installed just above the conveyor; there is a vertical tube and an unloading tube, capable of rotating 360° around the former and tilting up to 60° up and down, being driven by a reducer, electric motor, hydraulic motor or carding shaft, and it can also be placed in a hopper, through a drawer placed at the rear of said silo or deposit; the rotation transmission between the vertical tube and the unloading tube consists of a mechanical transmission placed at the top of the first and at the rear of the second.

In order to do the unloading of the transported products, the container containing the material to be unloaded has sloping sides and a thread on the lowest part. This construction uses gravity to make the material fall on top of the thread and be placed on the threaded tubes. The use of tubes with internal threads is known in the art and is an efficient means of detaching the granular material from a lower part to a higher part, for example, from the container to a truck. These threaded tubes are associated with each other, in order to allow the material to move from the bottom of the container, pass over it and be taken by the unloading tube out of the container. This can be used to transport grain products in an intermodal manner, that is, between modes of transport, from a wagon to a truck, from a bulk silo to a truck, etc.

Threaded tubes have to move the product at angles that can be 45° between the vertical tube and the unloading tube, in order to remove the product from a lower part and pass it to a higher part. In order to pass the bulk product at an angle of 45°, some systems use threads joined together by means of a universal junction. With that, it is possible to transfer the material between a vertical tube and a horizontal tube. One means used for this can be seen in U.S. Pat. No. 6,767,174 which shows a self-unloading container mounted on a vehicle. A vertical threaded tube has its lower end in the container and the upper end outside the container. A threaded intermediate tube is rotationally connected at one end to the vertical threaded tube, so as to rotate about a pivot axis in a joint plane; and it is connected at the other end to a threaded side tube with a fixed oblique angle. A universal junction connects the intermediate trailing shaft to the vertical trailing shaft with the center of the junction on the shaft and pivot shaft. A constant velocity universal junction connects the intermediate trailing axis to the lateral trailing axis with a center located at the intersection of the pipe axes with intermediate and lateral threads. The threaded side tube rotates from a transport position aligned with the displacement direction to an operating position transverse to the displacement direction.

For the transfer of this type of material, many types of equipment depend on sets of threads, with which it is possible to move the material, for example, grains, from one point to the other, from a wagon with inclined sides (surge bins) to a truck. A set of threads dedicated to this can be seen in document US20140090958, where a set of threads for moving material is disclosed.

The set of threads includes a first thread section, a second thread section and a junction connecting the two sections. The second thread section includes a thread mounting outlet for distribution material, such as a harvested grain. The first thread section, second thread section and junction each rotate about their own axis, thereby causing the three-dimensional movement of the thread assembly and particularly the output of the thread assembly. The set of threads can be controlled manually, with a joystick, and automatically with an electronic controller. Also provided is a material handling apparatus that employs the disclosed set of threads and also includes a container to store the material to be moved by the set of threads.

Problems of the State of the Art

By analyzing the state of the art, one may notice that the transfer of granular material, such as grains, using tubes with internal threads is already known. Also, for the transfer of this material from a horizontal to a vertical pipe, a system with a thread arranged at an angle can be used, using universal junctions between the threads, or a terminal at the end of the thread, in the case of U.S. Pat. No. 4,669,945.

The major drawback of these transfer systems that employ articulated tubes is that, at the meeting point of two threads with different inclinations, there is a region that can suffer with blockages. There are several explanations for this, from the collision of the material with the wall of the other tube, to differences in angular velocity in the transported material.

DESCRIPTION OF THE INVENTION

Thus, in order to solve this problem of material blockages in the region where two tubes join, this system is proposed.

In addition to this issue, the developed conveyor system allows for a more efficient intermodal transport, ensuring that the cargo placed inside the container is transferred to the other mode of transportation within a very short timeframe.

The system is automatically activated by remote control, so that the operator can carry out the transfer operation without the need to be on the conveyor.

The cargo box, also called a reservoir, a mechanical unloading system and an independent hydraulic/electrical unit, is also part of the proposed system.

DESCRIPTION OF THE DRAWINGS

The characterization of the present invention is made by means of representative drawings of the conveyor system with cargo box and automatic unloading system, in such a way that the product can be fully reproduced with an appropriate technique, allowing for the complete characterization of the object's claimed functionality.

The report is based on the figures elaborated that express the best or preferential way of manufacturing the product, through a detailed and consecutive numbering, clarifying aspects that may be implied by the adopted representation, in order to clearly determine the protection that is hereby sought.

Figure 1:
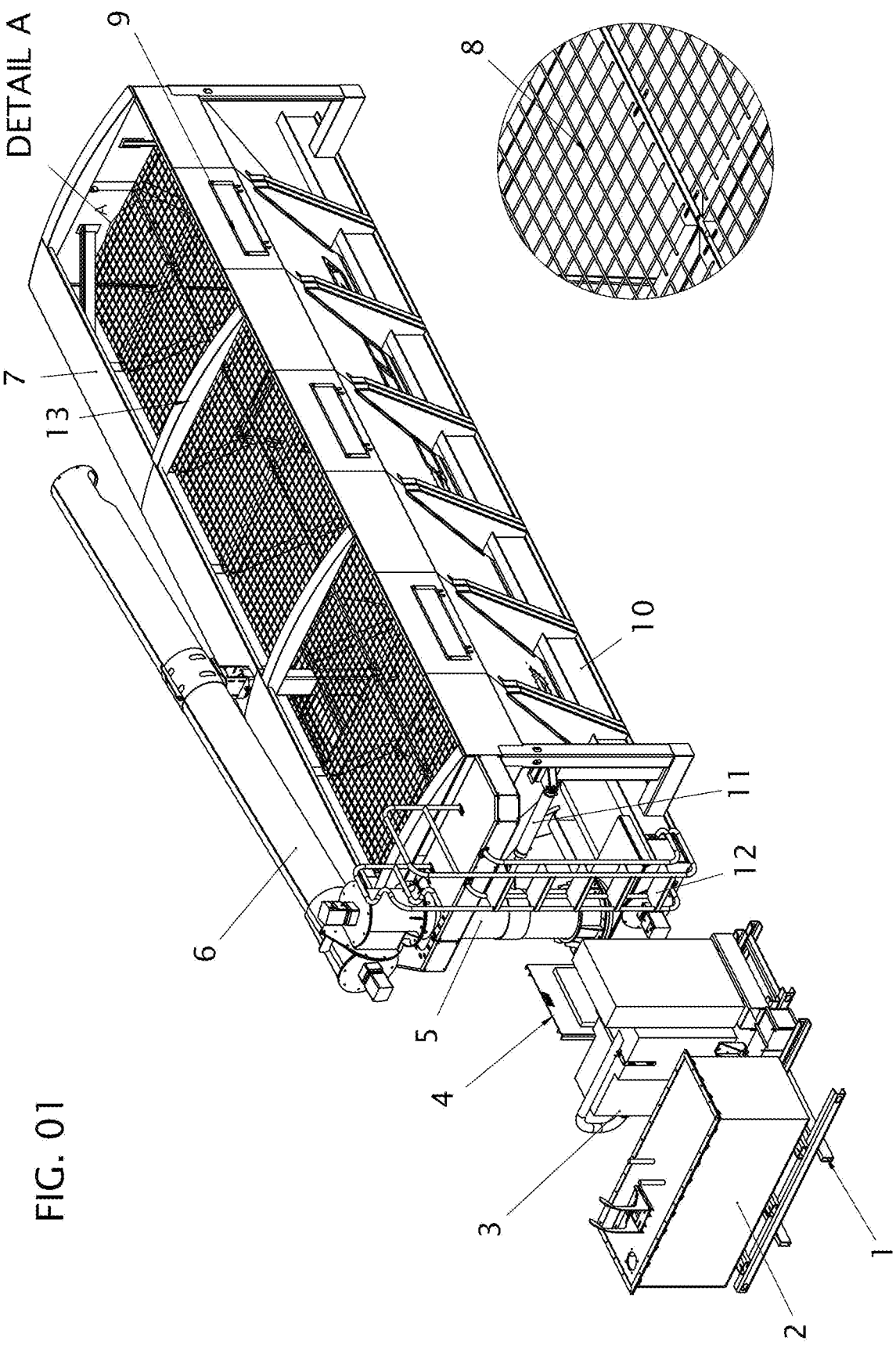
Figure 2:
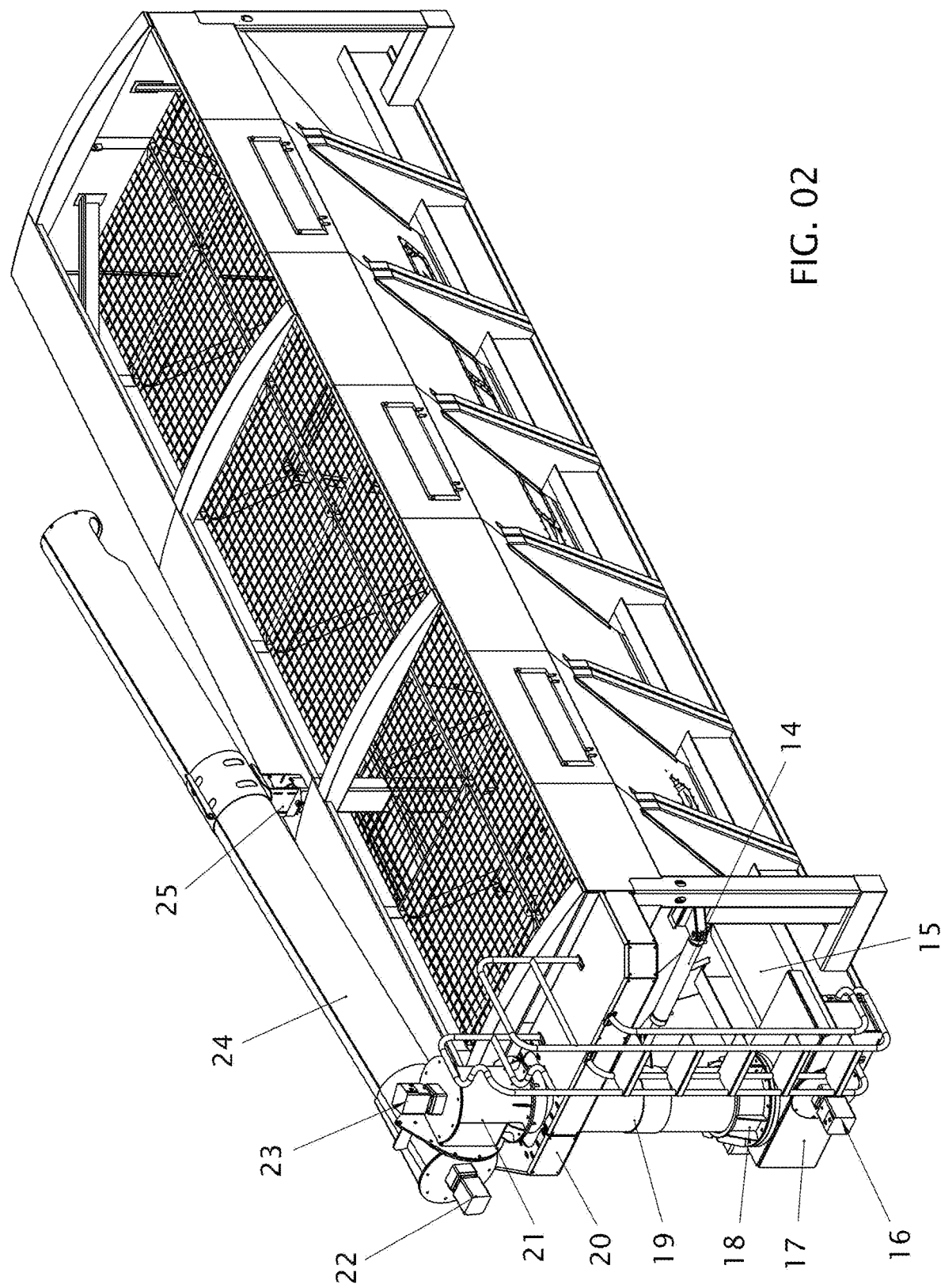
Figure 3:
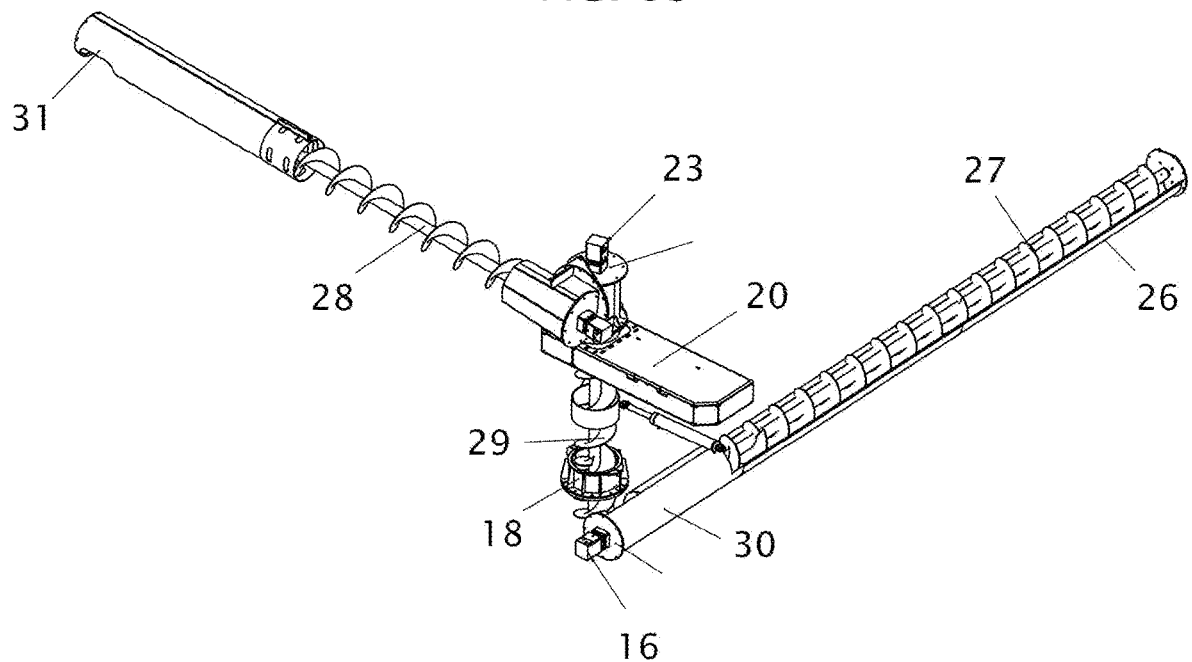

These figures are merely illustrative, and may vary, as long as they do not deviate from what was initially claimed. In this case:

FIG. 1 shows a perspective of the system with cargo box/reservoir, a mechanical unloading system and an independent hydraulic/electrical unit FIG. 2 shows a perspective of the cargo box alone FIG. 3 shows the helical thread system responsible for transferring the material from the cargo box to the other mode of transportation (not shown)

Figure 4:
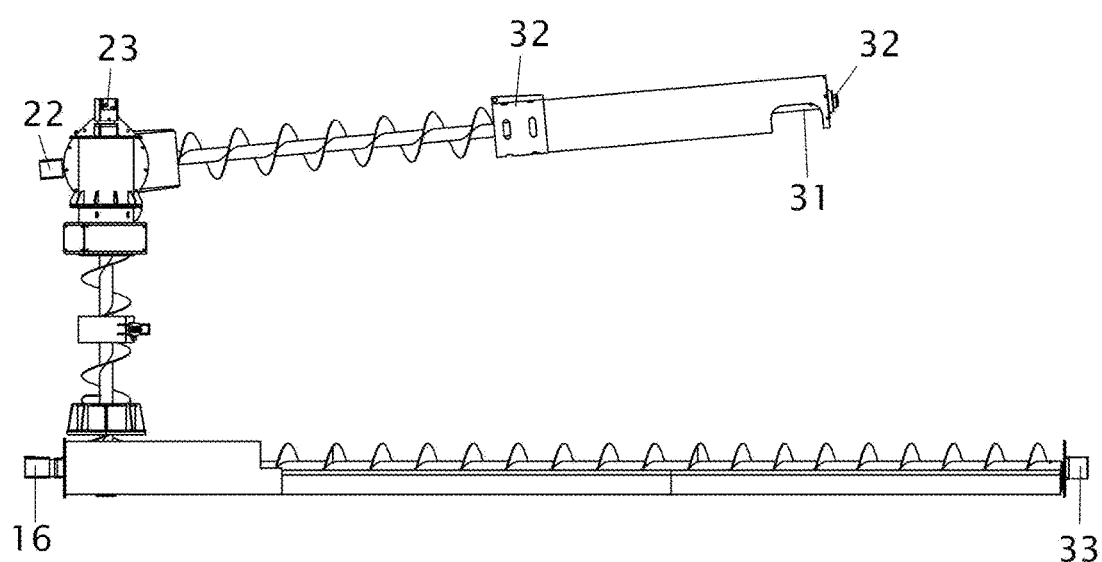

FIG. 4 shows the helical thread system responsible for transferring the material from the cargo box to the other mode of transportation (not shown)

FIG. 5 shows the helical thread system responsible for transferring the material from the cargo box to the other mode of transportation (not shown)

FIG. 6 shows the helical thread system responsible for transferring the material from the cargo box to the other mode of transportation (not shown)

Figure 7:
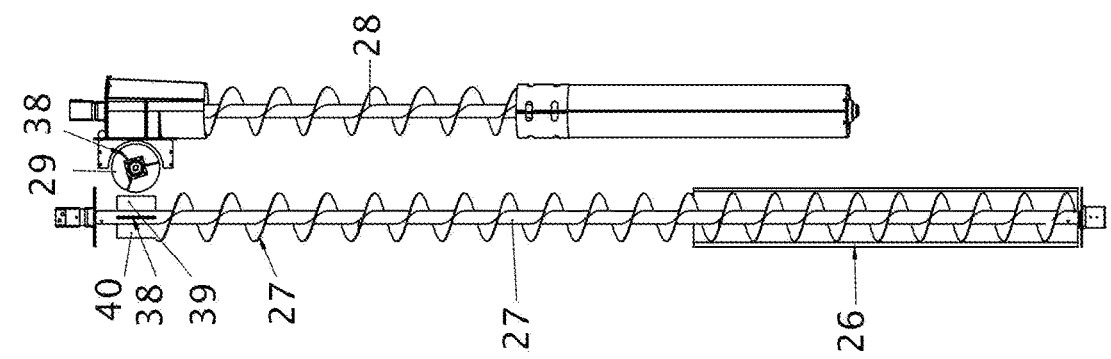

FIG. 7 shows the helical thread system responsible for transferring the material from the cargo box to the other mode of transportation (not shown)

Figure 8:
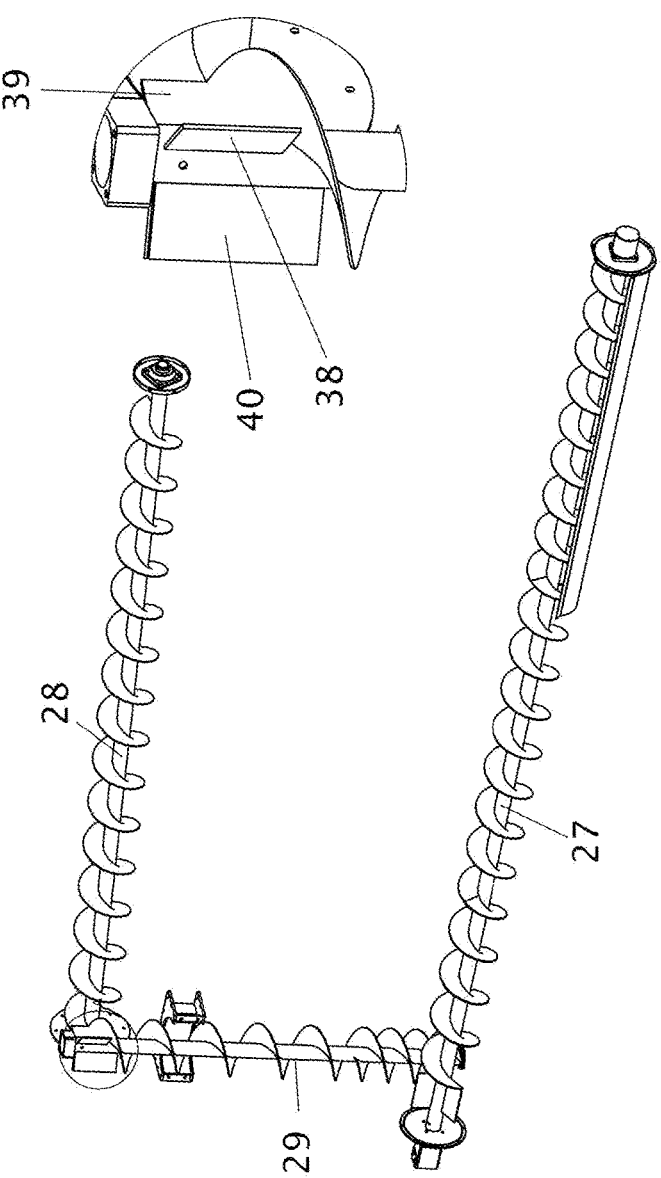

FIG. 8 shows the helical thread system responsible for transferring the material from the cargo box to the other mode of transportation (not shown)

Figure 9:
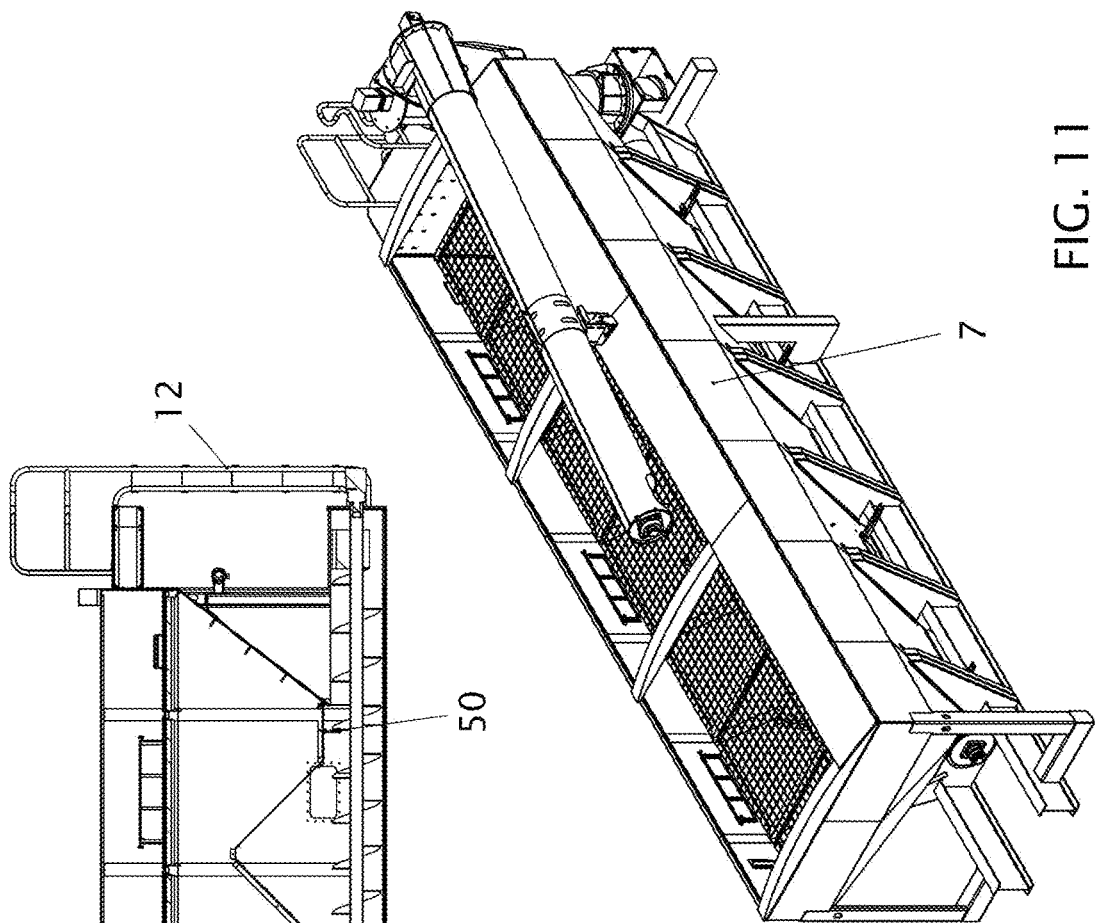

FIG. 9 shows a longitudinal section in the cargo box, in order to reveal the divisions with sloping sides and the lower thread.

Figure 10:
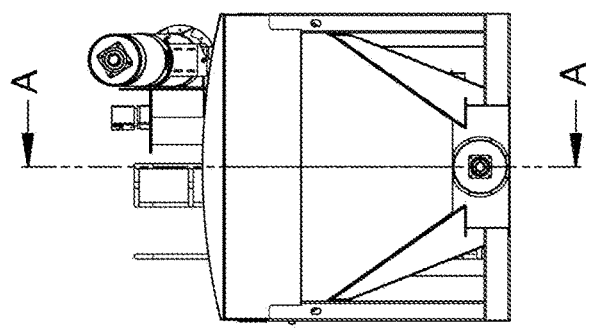

FIG. 10 shows the side of the box with the spikes next to the lower ski

Figure 11:
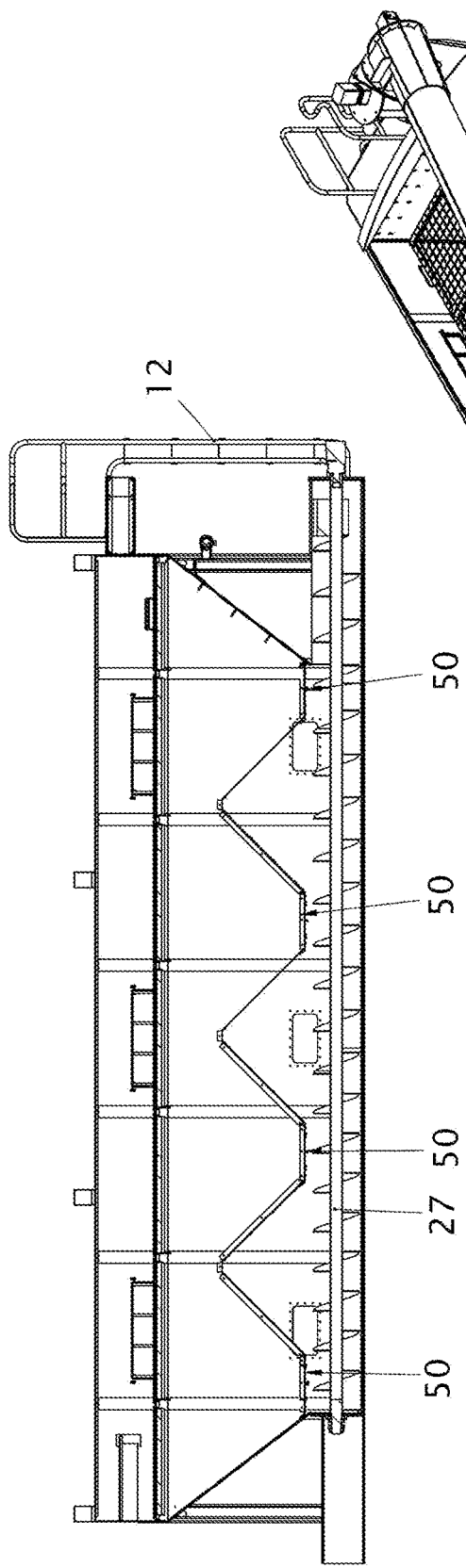

FIG. 11 shows a perspective of the box with the unloading tube parallel to it

Figure 12:
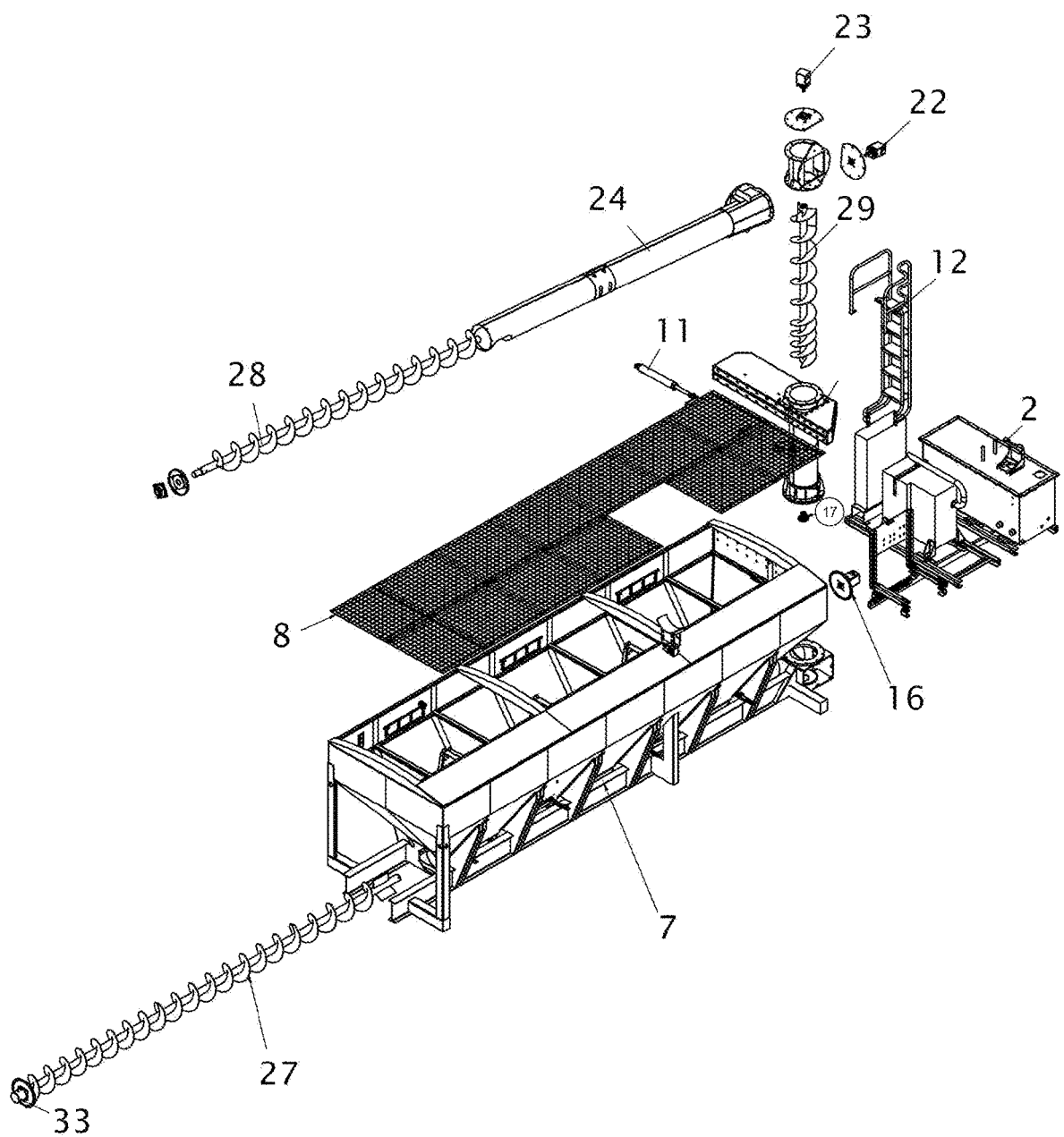

FIG. 12 shows an exploded perspective of the entire proposed system

Figure 13:
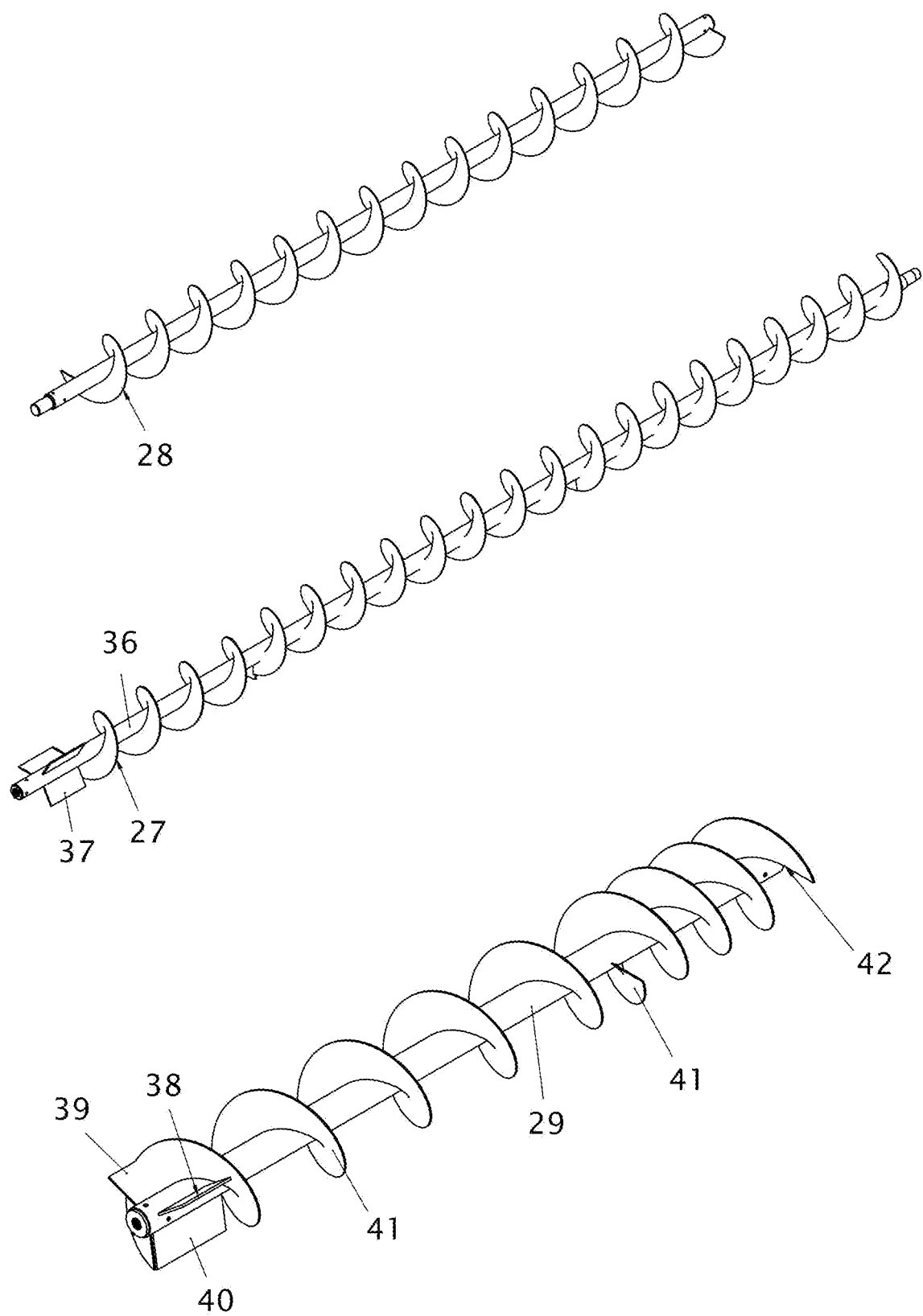
Figure 14:
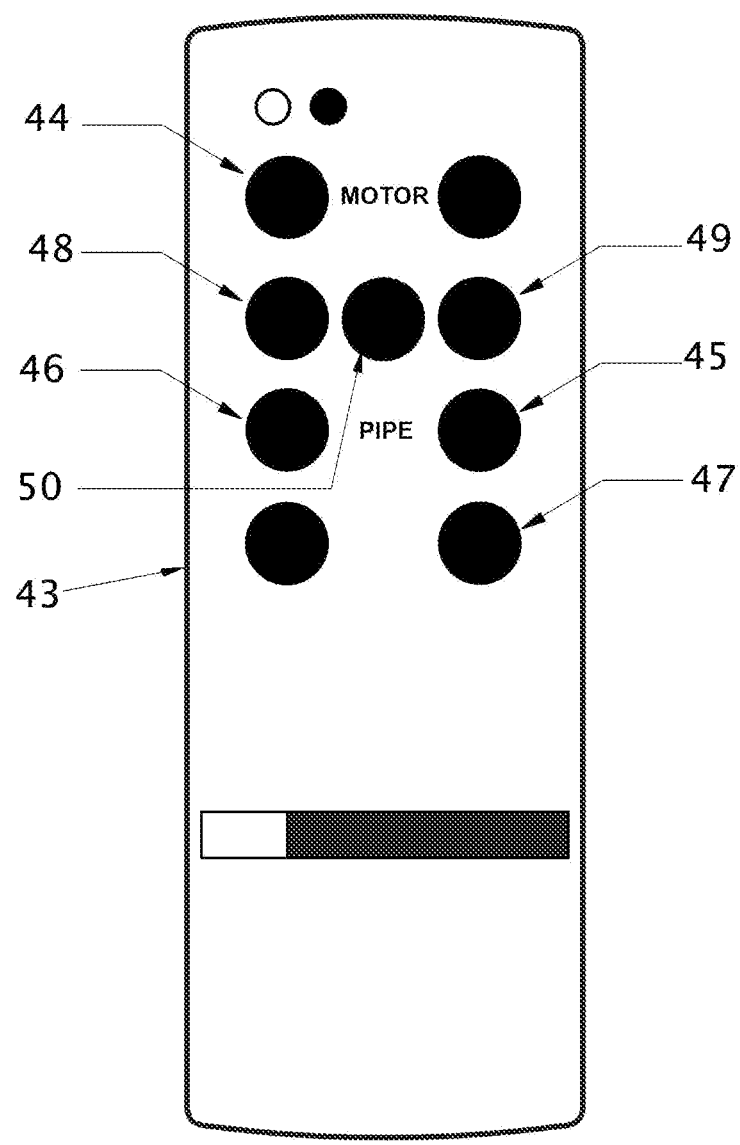

FIG. 13 shows the set of threads responsible for the movement of the material inside the tubes FIG. 14 shows the system's remote control.

DETAILED DESCRIPTION OF THE INVENTION

A preferred embodiment of the system comprises the set of rails (1) that support the hydraulic tank (2) and the motor (3) containing the activation commands (4), where this generator module cooperates with the cargo box (7) or storage tank of the product to be transported, containing a set of gates (50) to support the lower horizontal thread (27), whereas this product can be granulate, bran, powder or solid; wherein loading takes place in the cargo box (7) through the upper opening, positioned in the opening between the tarpaulin arches (13). Just below the tarpaulin arches (13), inside the cargo box (7), there is a solids separating grid (8), which prevents the passage of foreign materials or impurities that can cause damage to the mechanical system of the equipment. In the same line as the solids separating grid (8), there are inspection windows (9) for the removal of foreign objects, whether they are stones, bricks, etc. At the bottom of the cargo box (7), there are two beams that are part of the chassis (10) of the cargo box (7), from which a ladder (12) is projected to access the upper part of the cargo box (7), and parallel to the ladder (12) a vertical tube (5) is mounted, which provides anchoring for the horizontal tube (6) both with freedom of rotation, through the hydraulic rotation cylinder (11).

The cargo box (7) contains the lower horizontal tube (15) that contains the conductive track (26) and the lower horizontal thread (27), with this thread (27) being driven by the hydraulic motor (16), and the lower bearing (18) of the vertical tube (19) rests on the lower housing (17), where said vertical tube (19) is connected to the upper turning bearing (20), containing the associated upper housing (21) to the hydraulic motor (23) of the vertical thread (29), which is arranged between the lower bearing (18) and the upper bearing (34) attached to the upper housing (35), and the upper horizontal tube (24) also contains a motor (22) that drives the respective upper horizontal thread (28) attached to a bearing (32), where the tube (24) rests on a mount (25) and can rotate driven by a hydraulic rotation cylinder (14).

The thread system for transporting the product comprises the conductive track (26) of the lower horizontal thread (27), with this conducting track (27) forming part of the conducting tube (30) containing the hydraulic motor (16) responsible for the rotation of the lower horizontal thread (27), also supported on a bearing (33), whereas between this lower horizontal thread (27) and the vertical thread (29) and between the vertical thread (29) and the upper horizontal thread (28) there is a material transfer mechanism, which leads this material to the unloading nozzle (31) of the upper horizontal tube (24), and this tube (24) contains a strap (32) joining the two parts of the tube (24).

The transfer mechanism used to transfer the material from the lower horizontal thread (27) to the vertical thread (29) comprises a set of paddles (37) that are arranged orthogonally and diametrically opposite the axis (36) of the vertical thread (29), so that the material that reaches this joint can be transferred from the lower horizontal thread (27) to the vertical thread (29), where said thread (29) also has a set of paddles that comprise the middle paddle (38), outlet paddle (39) and inlet paddle (40) that transfer the material that arrives at the junction of the vertical thread (29) with the upper horizontal thread (28), and said vertical thread (29) contains thread single-pitch (41) and double-pitch thread (42) near the material transfer region to the paddles (37) of the lower horizontal thread (27).

The system has a remote control (43) with a button (44) that engages the engine power unit (3), where the open (45) and close (46) buttons move the tube (6) through the hydraulic turning cylinder (11).

The control has a horn activation button (47), thread activation button in hare (48) and turtle mode (49), varying the unloading flow, and a thread disconnect button (50) that stops the transport system.

The gates (50) can be opened according to the flow requirement, which allows for the supply the lower horizontal thread (27) by sliding over the conducting track of the lower horizontal thread (27).

In detail A in FIG. 6, one can see the inclusion of paddles in the lower horizontal thread (27) mounted on the axis (36) of the lower horizontal thread (27), implying a change in the transport of the product by translation in the parallel axis direction (36), to a rotation direction in the same axis (36), transporting the product by the vertical thread (29) and at the end, changing the translation transport model parallel to the axis (36), until the product reaches the paddles (37), transmitting a rotation movement to the transported product, thus directing it to the vertical thread (29), mitigating any possibility of strangulation, blockage or stopping in the course of the transported product, eliminating torque efforts and reducing the power and energy required to get the job done. Also, the vertical thread (29) transports the product in a combined vertical rotation and translation movement to the upper horizontal thread (28).

The movement of actuation of the threads is shown in FIG. 4, where the engine (3) transmits hydraulic energy through the fluid stored in the hydraulic tank (2) to the actuation commands (4), which are activated by the remote control (43).

The motors (16, 22 and 23) are activated to carry out the movement of the threads (27, 28 and 29), where said threads are bi-supported, one side on the motors (27, 28 and 29) and the other side on the bearings (32 and 33).

The product passes through the gates (50), is collected by the lower thread (27), transported by the vertical thread (29) to the upper horizontal thread (28), followed by the unloading tube (11) that can be moved in up to 90° for unloading.

The invention claimed is:

1. A cargo unloading mechanism comprising
a hydraulic tank supported by a set of rails and containing hydraulic fluid,
a plurality of hydraulic motors powered by hydraulic fluid to rotate, one of said motors having electronic controls including an activation command,
a container, the container being either a cargo box or storage tank, and containing a product to be unloaded, the product being selected from the group consisting of granulate, bran, powder or solid,
the container further comprising:
  a set of gates at the container bottom that can be opened according to the requirements of unloading processes, and
  an upper opening with tarpaulin arches configured such that the container can be loaded at a point in between the tarpaulin arches,
  a grid configured to separate solids and positioned such that the product loaded into the container will pass though the grid,
  an inspection window,
a container chassis comprising two beams from which a ladder protrudes and allows access to the containers upper portion,
a conveyor system comprising a vertical tube with an internal thread, said vertical tube anchored parallel to the ladder, said internal thread is rotated by one of said hydraulic motors, the thread configured to move product upward within the vertical tube,
the vertical tube upper end connects to one end of an upper horizontal tube with internal threads, the upper horizontal tube end pivotably mounted to the vertical tube upper end such that the other end of the upper horizontal tube is free to rotate into a position convenient for unloading product from said other end, the rotation being powered by one of said hydraulic motors.

2. The cargo unloading mechanism of claim 1 wherein:
the conveyer system further comprises a lower horizontal tube located under the gates at the container bottom, said lower horizontal tube having an internal thread rotated by one of said hydraulic motors, the thread configured to move product horizontally from the area under the gates to the lower end of the vertical tube.

3. The cargo unloading mechanism of claim 1 wherein the electronic controls further comprise:
a remote control mechanism with a button that, when pressed, engages said hydraulic motors so as to either start rotation of the threads or to stop rotation of the threads,
a horn activation button that signals when the b,
a button engaging rotation of the threads in either a fast (hare) mode or a slow (turtle) mode.

4. The cargo unloading mechanism of claim 3 wherein the material transfer mechanism further comprises a set of paddles that that transfer product from the tube upstream of the material transfer mechanism to the tube downstream of the material transfer mechanism.

5. The cargo unloading mechanism of claim 1 wherein the electronic controls further comprise:
a remote control mechanism with a button that, when pressed, engages said hydraulic motors so as to either start rotation of the threads or stop rotation of the threads,
a horn activation button that signals when the mechanism is in operation, and
a button engaging rotation of the threads in either a fast (hare) mode or a slow (turtle) mode.

* * * * *